United States Patent Office 3,000,746
Patented Sept. 19, 1961

3,000,746
INHIBITION OF FALSE SET IN PORTLAND CEMENT
Joseph P. Copes, Easton, Pa., and Raymond L. Mayhew, Phillipsburg, N.J., assignors to General Aniline & Film Corporation, New York, N.Y., a corporation of Delaware
No Drawing. Filed June 26, 1957, Ser. No. 668,021
6 Claims. (Cl. 106—94)

The invention here presented is a new procedure for the treatment of Portland cement and its mixtures to prevent the undesirable phenomena known as "false set" or prestiffening of certain batches of cement by the treatment of such cement batches with materials as hereinafter disclosed.

Portland cement is commonly prepared by the burning of a silicious mixture into a clinker which is then powdered in an appropriate mill, usually a rod mill, to produce a composition which will react with water and crystallize and harden to yield a very stout synthetic stone. Since, however, the powdered cement is relatively expensive, usually considerable quantities of sand, gravel, and other aggregates are added to the mixture in order to make the greatest possible use of the cementing power of the burned, powdered material.

It may be noted that the proportions of sand and gravel may vary widely. Cements, mortars, and concretes may be made containing no sand or gravel, or just sand and Portland cement in varying proportions say from 1 to 1 by volume to 1 part cement to 5 parts sand, although 1 part cement to 3 parts sand is usually the greatest dilution in common use. Various concretes may be made in ratios say, from equal parts of cement, sand, and gravel, to as much as 5 parts sand and 5 to 6 parts of gravel per part of cement, by volume. It may be noted further that the amount of water used is usually sufficient to make a reasonably fluid mixture, but usually care is taken to avoid such an amount of water that there is a substantial settling of the ingredients to leave a significant quantity of muddy water on top of the mixture. The amount of water added varies widely with the amount of and the wetness of the sand, gravel, or other aggregate so that without knowing these characteristics the amount of water rarely can be given. However in usual industrial cement work the amount of water varies from about 4 gallons per cubic foot of cement used up to 8 gallons per cubic foot of cement used. Four gallons is about as low as possible, the higher figure is for wet sand, and/or when larger amounts of sand are present. The lowest possible amount of water is used because this results in the greatest strength.

The mixture is normally prepared by putting together the cement, sand, gravel and a sufficient amount of water with very thorough mixing.

Such mixing is required to be quite thorough and it takes a substantial length of time, and the mixing is commonly done in relatively large power-driven mixers, from which the material must be transported to the site where it is poured, placed or otherwise used. As so prepared, the material remains plastic for a substantial length of time and then stiffens gradually into the desired hard, stonelike mixture, the length of time between the completion of the mixing and the beginning of setting, normally being sufficient for transportation of the mix and delivery into the forms or to the mason or stone worker or bricklayer or other workmen. Such a time interval between final mixing and initial set is extremely important for the placing of good sound concrete for any use. This time interval is commonly in the order of one hour. While "initial set" is carefully defined in the technical literature, it may be spoken of as a degree of hardness of the mortar. In actual practice the initial set is much too stiff for proper placement. The concrete, mortar, and the like is placed before the "initial set" stage is reached. The cement slurry must remain plastic for a time sufficiently long to permit proper placement and it seems reasonable to require the cement to remain plastic for at least 15 minutes.

Unfortunately however occasional batches of the Portland cement show, for some wholly unknown reason, an unusual stiffening which occurs very soon after the mixing. This is not an initial set, since it can be reversed by vigorous stirring and the mix brought back to its more or less liquid consistency; but it is a stiffening to a sufficient degree to make it impossible to place the mix properly in the forms, or between the brick or stone or other components to be cemented. This phenomena is known in the art as "prestiffening" or "false set" and is a well known and troublesome item in the structural field, particularly among those builders dealing with cement or concrete structures. This phenomena will be more defined by the standard test results hereinafter described. To the present no clue has been discovered why this quick stiffening of the mixture occurs since it appears in cement made in the same plant, by the same process, from the same materials which produce satisfactory Portland cement, and this undesirable characteristic may appear without warning and disappear without reason. Such characteristics of any Portland cement with these properties are highly undesirable and almost unsaleable, and in consequence very substantial losses may result unless they are corrected by the procedure of the present invention. Various theories have been advanced from time to time. These usually deal with the temperatures used in roasting, the degree of roasting of the clinker, the degree of hydration of the gypsum which is present and which dehydrates in the kiln. However, it seems that "false set" is still a mystery, for example, it is not accompanied by an evolution of heat as one would expect from the hydration of gypsum. No other theory that has had much attention has held up. Until the present no effective remedy has been found for overcoming this defect, and the cement must either be discarded or the cement mixture prepared from the defective Portland cement must be remixed to break the stiffening. Discarding the cement is overly expensive, and the necessity for double mixing requires extra cost, extra labor, extra time, and the like, all being highly objectionable.

According to the present invention it is now found that certain specific compounds show the unexpected and rather astonishing property of preventing this false set, and causing these otherwise difficult batches of cement to harden normally to yield a normal pourable mix having a normal setting time.

Representative substances showing this property of destroying false set are found in tall oil-N-methyl-taurine-sodium having the following structural formula:

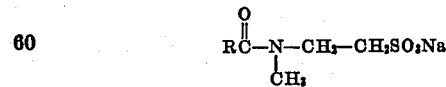

the

being derived from tall oil, and also in sulfonated oleic acid.

In the case of the first compound it will be noted that tall oil is derived from wood and is usually obtained as a by-product in the manufacture of paper pulp. A representative composition would be 38 to 58% rosin acids, 54–36% fatty acids plus minor amounts of sterols, alcohols, etc. The rosin acids are related to abietic acid, the fatty acids are related to oleic acid.

In the case of the sulfonated oleic acid, the oleic acid, in the form of a commercially available product such as red oil is treated with sulfuric acid. The sulfuric acid presumably reacts at the points of unsaturation in the carbon chain to form the inhibitor. The product used in the present invention had a specific gravity of 1.11, contained 35% fats, was used as the alkali metal salt and existed as an amber colored, clear somewhat viscous liquid.

In order to practice the invention it is first necessary to test the Portland cement to determine the tendency toward prestiffening or false set. This is done as in Example 1.

The following examples are offered as showing the preferred method of practicing the invention, not as imposing any limitations upon the claims solicited.

*Example 1*

A mortar type Portland cement was tested for false set according to ASTM C 359–55T mentioned above. In accordance with the specification the formula was:

Cement _____g__ 600
Sand _____g__ 600
Liquid _____cc__ 192

When the procedure was completed, the following penetrometer values were obtained:

Penetration: Mm.
  Initial _____ 50+
  After 5 min_____ 30
  After 8 min_____ 35
  After 11 min_____ 33

This example illustrates a Portland cement with a decided tendency to prestiffening. This degree of prestiffening may vary from one cement to another; cements will be found with a greater or lesser tendency to this defect. The values obtained should not, therefore be construed as a full definition of a defective cement, but illustrate a cement that could not be used and could not be poured satisfactorily into the forms. 50 is the highest reading on the scale representing the greatest penetration. 50+ indicates that the penetrometer penetrated to the end of the scale and struck the guides.

Having determined defective batches of cement, the invention is practiced by adding remedial quantities of inhibitor to the cement.

The additive may be mixed with the dry cement regardless of the fluidity or solidarity of the additive and the mixture of cement and additive may be prepared at the factory. Alternatively the additive may be added on the job, before mixing or during mixing provided only that it is well mixed into the final composition.

The mix may be prepared as usual with appropriate proportions of Portland cement, sand, gravel, other aggregates and the like and to the mixture may be added from 0.001% to 0.5% of the desired false set inhibitor selected from the above indicated structures. The resulting mix then retains its normal fluidity for the normal period of time and then sets normally to yield a finished concrete of normal strength, grain, color, and other properties.

It will be noted that the amount of additive used is so small that the cost is negligible and accordingly cement showing this property of false set, which would otherwise be unusable, and waste, becomes fully satisfactory.

Other objects and details of the invention will be apparent from the following description and examples.

*Example 2*

Example 1 was followed, except that to the mortar, as it was being mixed, was added 1½ cc. of an N-alkyl-N-methyl-taurine solution. This represented 0.06% additive based on the weight of dry Portland cement. The water added was adjusted so that the total liquid added was equal to the liquid of Example 1.

The Portland cement used in this example was the same material used in Example 1. Penetration readings follow:

Penetration: Mm.
  Initial _____ 50+
  After 5 min_____ 50+
  After 8 min_____ 50+
  After 11 min_____ 50+

This example illustrates the complete elimination of the tendency to false set through the addition of the inhibitor.

*Example 3*

Example 2 was repeated except that 1 cc. of the sodium salt of sulfonated oleic acid, was incorporated in the mixture at the beginning of mixing instead of the inhibitor of Example 2. This represents an addition of about 0.2% based on the dry cement content of the mixture. Penetration readings follow:

Penetration: Mm.
  Initial _____ 50+
  After 5 min_____ 50+
  After 8 min_____ 50+
  After 11 min_____ 50+

This example illustrates the complete elimination of false set through the use of this additive.

Thus the composition of matter and process of the invention avoid the phenomenon known as "false set" in Portland cement mixtures by the addition to the mortar of small amounts, less than 1%, of an additive.

While there are above disclosed but a limited number of embodiments of the composition of matter and process of the present invention, it is possible to provide still other embodiments without departing from the inventive concept herein disclosed, and it is therefore desired that only such limitations be imposed upon the appended claims as are stated therein or required by the prior art.

The invention claimed is:

1. A Portland cement composition consisting essentially of a Portland cement having the characteristic of "false set" together with from 0.001 to 0.5% by weight of said Portland cement of an additive selected from the group consisting of N-methyl taurides of tall oil acids and sulfonated oleic acids, said composition being characterized by freedom from "false set" when mixed with water and aggregate.

2. A composition as defined in claim 1 wherein the additive specified is the sodium salt of the N-methyl tauride of tall oil acids characterized by the structural formula

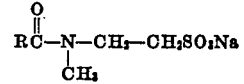

wherein

represents the acyl residue of tall oil acids, characterized by ranges of 38% to 58% rosin acids, 54–36% fatty acids, plus minor amounts of sterols, alcohols, etc.; the rosin acids being related to abietic acid, the fatty acids being related to oleic acid.

3. A composition as defined in claim 1 wherein the additive specified is the sodium salt of sulfonated oleic acid.

4. A process for avoiding "false set" in Portland cement which comprises incorporating in a Portland cement having the characteristic of "false set" from 0.001 to 0.5% by weight thereof of an additive selected from the group consisting of the sodium salts of N-methyl taurides of tall oil acids and sulfonated oleic acid whereby there is no prestiffening of the type of "false set" when the thus treated Portland cement is mixed with water and aggregate.

5. A process as defined in claim 4 wherein the additive specified is a sodium salt of N-methyl tauride of tall oil acid having the structural formula

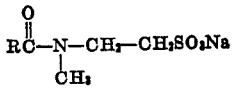

wherein

represents the acyl residue of tall oil acids, characterized by ranges of 38% to 58% rosin acids, 54–36% fatty acids, plus minor amounts of sterols, alcohols, etc.; the rosin acids being related to abietic acid, the fatty acids being related to oleic acid.

6. A process as defined in claim 4 wherein the additive specified is the sodium salt of sulfonated oleic acid.

References Cited in the file of this patent

UNITED STATES PATENTS

| | | |
|---|---|---|
| 2,004,545 | Wolf | June 11, 1935 |
| 2,311,289 | Booth | Feb. 16, 1943 |
| 2,420,144 | Mark | May 6, 1947 |
| 2,510,776 | Gabrielson | June 6, 1950 |
| 2,644,771 | Kempthorne | July 7, 1953 |